Feb. 5, 1946.                C. G. STRANDLUND                 2,394,117
                              HYDRAULIC POWER LIFT
                              Filed Feb. 10, 1943            5 Sheets-Sheet 1

FIG. 1

INVENTOR.
CARL G. STRANDLUND
ATTORNEYS

Feb. 5, 1946.   C. G. STRANDLUND   2,394,117
HYDRAULIC POWER LIFT
Filed Feb. 10, 1943   5 Sheets-Sheet 3

INVENTOR.
CARL G. STRANDLUND
ATTORNEYS

Feb. 5, 1946.　　　C. G. STRANDLUND　　　2,394,117
HYDRAULIC POWER LIFT
Filed Feb. 10, 1943　　　5 Sheets-Sheet 4

INVENTOR.
CARL G. STRANDLUND
BY
ATTORNEYS

Patented Feb. 5, 1946

2,394,117

UNITED STATES PATENT OFFICE 2,394,117

HYDRAULIC POWER LIFT

Carl G. Strandlund, Moline, Ill., assignor to Deere & Company, Moline, Ill., a corporation of Illinois Application February 10, 1943, Serial No. 475,451

19 Claims. (Cl. 97—72)

The present invention relates generally to agricultural implements and more particularly to power means for raising and lowering or otherwise adjusting the position of tools or other parts.

The object and general nature of the present invention is the provision of a compact efficient hydraulic unit forming a part of the implement and deriving energy from a ground wheel thereof for raising or lowering the tool or tools or other parts of the implement, with suitable means for effecting the desired depth and lifting control. More specifically, it is a feature of this invention to provide a hydraulic unit connected between the implement frame and the swinging crank axle thereof, wherein the pump, ram unit and reservoir are formed of coaxial portions, with the pump unit driven by the ground wheel that is connected with the swinging axle.

It is a further feature of this invention, particularly adapted for use with farm implements but not necessarily limited thereto, to provide means for automatically disabling the pump when the crank axle or other implement part has been moved to a given position, thereby protecting the hydraulic unit parts against overloads while assuring a full range of effective operation.

Still further, another feature of this invention is the provision of a hydraulic unit embodying a pump casing and a surrounding cylinder member, whereby the pump casing serves as the piston for said cylinder, and another feature of this invention is the provision of a combined reservoir and cylinder, with suitable valve means controlling the flow of fluid from the reservoir into the pump that delivers the fluid under pressure into said cylinder. A more specific feature of this invention is the provision of a hydraulic unit including a pump having a plunger driven by cam action and arranged with valve means controlling the flow of fluid to be pumped so that when no fluid is permitted to flow to the pump, the plunger remains in a retracted non-operative position. Still further, another feature of this invention is the provision of an agricultural implement in which the hydraulic unit is automatically disabled, as by opening the intake valve and holding the same open, when the implement has been raised to a given position.

Another feature of this invention is the provision of improved depth adjusting means so constructed and arranged as to serve as an available emergency lift in the event that the hydraulic lift and/or its automatic control is disabled. More specifically, it is a feature of this invention to provide a crank screw type of adjustment, with a support for carrying the adjusting crank and arranged so that the support may be used as a lever for raising the implement to a transport position in the event of failure of the other raising means or for any other reason.

These and other objects and advantages of the present invention will be apparent to those skilled in the art after a consideration of the following detailed description, taken in conjunction with the accompanying drawings.

Figure 1:
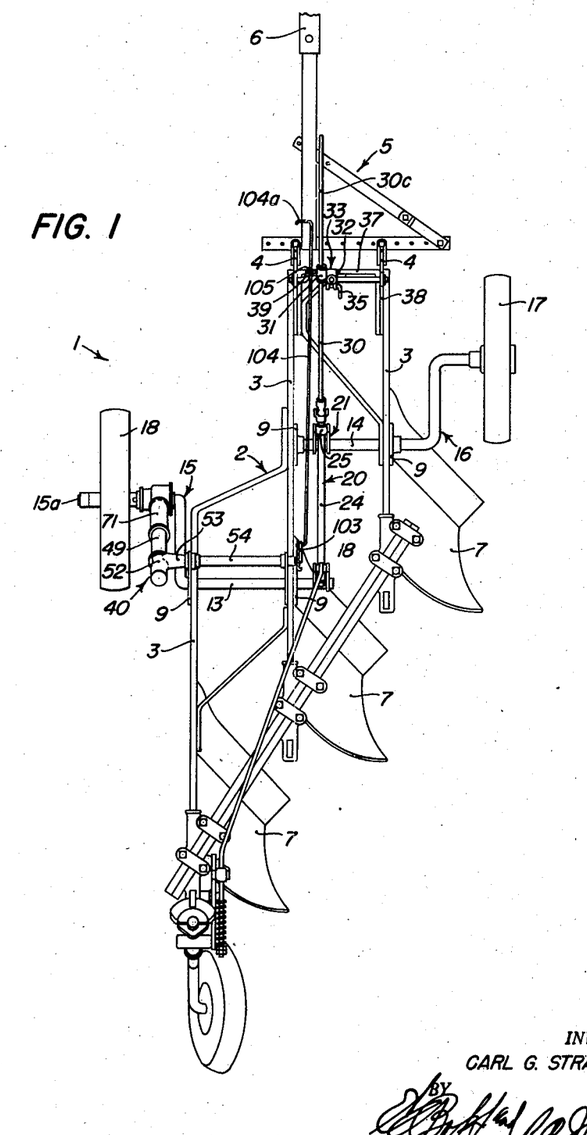
Figure 1 is a plan view of an agricultural implement in which the principles of the present invention have been incorporated.

Referring now to the drawings, more particularly Figure 1, the agricultural implement, in the present instance, a plow, is indicated in its entirety by the reference numeral 1 and comprises a frame 2 consisting of one or more plow beams 3 and associated braces and other structure which form the frame or support of the plow. At their forward ends, the plow beams have brackets 4 to which suitable hitch mechanism 5 is connected, and the hitch 5 serves to connect the plow to the drawbar 6 of a tractor or other propelling agency. The rear ends of the beams 3 are formed to receive plow bottoms 7, as in conventional practice. Bolted to each of the beams 3 is a supporting bracket 9, and journaled in suitable bearings in the latter are the transverse portions 13 and 14 of left and right crank axles, indicated, respectively, by the reference numerals 15 and 16. Ground wheels 17 and 18 are journaled for rotation on the crank axles 15 and 16, one wheel being a land wheel and the other a furrow wheel operating normally in the last furrow opened on the previous round. In order that the two wheel carrying axles 15 and 16 may be rocked in unison, an arm 19 is fixed to the inner end of the intermediate portion 13 of the crank axle 15 and is connected by adjustable linkage, indicated in its entirety by the reference numeral 20, with a second arm 21 fixed to the intermediate portion 14 of the other crank axle 16.

Figure 2:
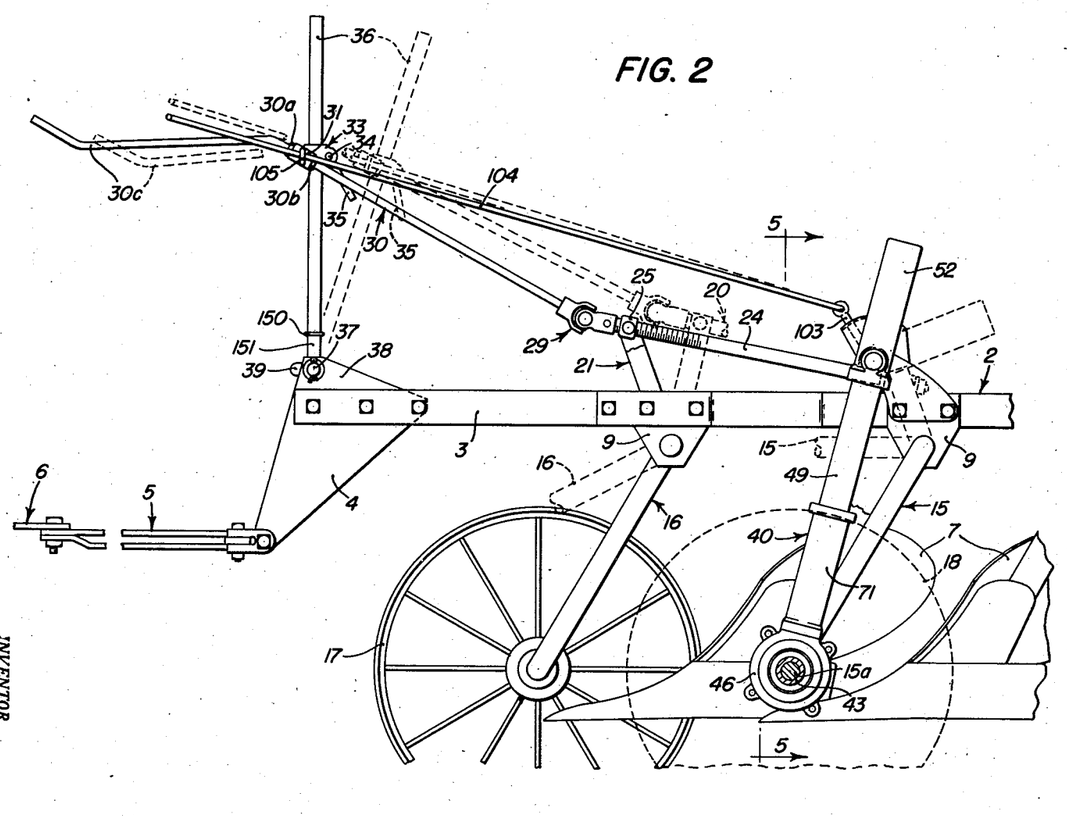
Figure 2 is a fragmentary side view of the implement shown in Figure 1, showing in particular the arrangement of the hydraulic raising and lowering unit and the depth adjusting means cooperatively associated therewith.

The adjustable linkage, by which the plow may be leveled by adjusting one crank axle relative to the other, comprises a rod 24 threaded at its forward end into a nut member 25 swiveled at the upper end of the arm 21. The rear end of the rod 24 is rotatably supported in a trunnion 26 carried at the upper end of the arm 19, longitudinal movement of the rod 24 in the trunnion support 26 being prevented by suitable collars 27 and 28 on opposite sides thereof, as best shown in Figure 2. A universal joint 29 is fixed to the forward end of the rod or shaft 24 and to the rear end of a generally forwardly extending crank member 30. The forward end of the member 30 is supported in a sleeve 31 which, at one side, is provided with a stud 32 extending therefrom but not passing through the sleeve. The stud 32 serves as a rocking support for the sleeve 31 and serves to support the latter on a clamp casting or similar member 33 having a manually operated screw 34 with a handle 35. Turning the handle in one direction serves to clamp the member 33 to a generally upwardly extending member 36 which at its lower end is fixed to a transverse shaft 37 the ends of which are supported in brackets 38 fixed to the forward ends of the right hand beams 3. A bend or offset 39 is formed in the supporting shaft 37. A pair of collars 30a and 30b are fixed to the crank 30 on opposite sides of the sleeve 31 so as to prevent lateral movement of the crank in the sleeve. Thus, by turning the handle portion 30c of the crank 30 in one direction or the other, one crank axle may be rocked relative to the other, thus leveling the plow in operation, but the threaded connection between the rod 24 and the nut member 25 is irreversible and therefore when the crank 30 is left in any given position, the two crank axles 15 and 16 are locked to swing together.

The manner in which this linkage is utilized as an emergency lift will be described below.

The crank axles 15 and 16 are adapted to be rocked together, both for adjusting the depth of operation and for lifting the plows from the ground for transporting the implement from one place to another, and according to the principles of the present invention, novel hydraulic means is provided by which both the raising and depth adjusting may be accomplished.

Referring now more particularly to Figure 2, the laterally outturned section of the crank axle 15 on which the ground wheel 18 is mounted is indicated by the reference numeral 15a, and rockably disposed about the crank axle section 15a is a hydraulic unit indicated in its entirety by the reference numeral 40. Briefly, the hydraulic unit 40 consists of a pump, a ram unit deriving energy from the pump, and a reservoir, all arranged in a compact unit and connected between the swinging end 15a of the crank axle 15 and the frame 2 of the implement.

Figures 5, 7:
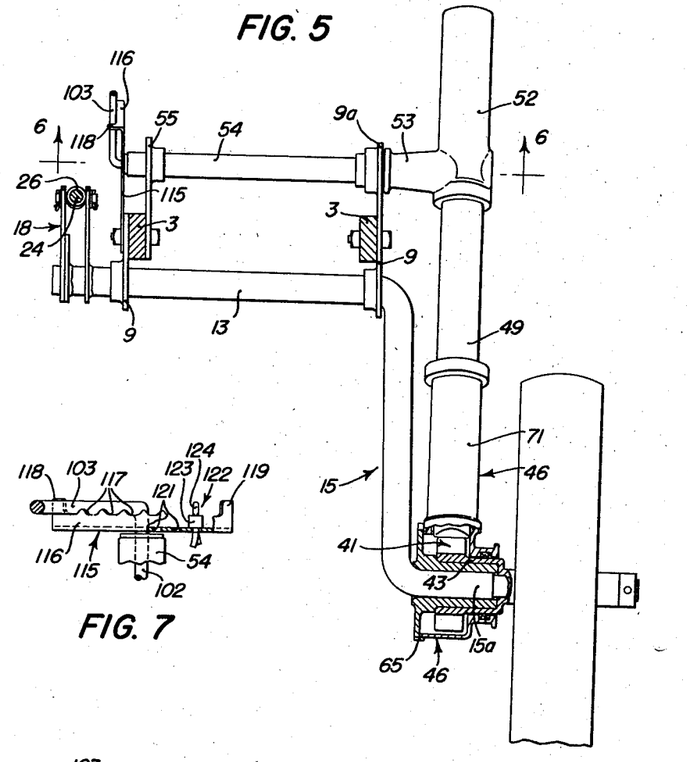
Figure 5 is a fragmentary view, taken generally along the line 5—5 of Figure 2.
Figure 7 is an enlarged view taken generally along the line 7—7 of Figure 8.

Disposed about the section 15a of the crank axle 15 is a cam member 41 (Figure 3) having a plurality of cam projections 42 and a hub 43 which is adapted to be connected in any suitable manner with the hub of the land wheel 18, as clearly shown in Figure 5. Also disposed about the crank axle section 15a is a pump casing, indicated in its entirety by the reference numeral 46, and enclosing the cam wheel 41. The upper portion of the pump casing 46 is formed as a pump cylinder 47 in which a hollow pump plunger 48 is disposed for reciprocation. The latter has a hardened insert or head 50 adapted to bear against the cam wheel 41 under the action of a relatively light spring 51. The plunger 48 fits snugly in leak-tight relation within the pump cylinder 47, and also disposed in substantially leak-tight relation about the outside of the pump casing cylinder 47 is a ram cylinder 49, the upper end of which is formed with a screw-threaded or press fit connection with the lower end of a tubular member 52 which forms a reservoir for the hydraulic unit.

The lower end of the member 52 is provided with a lateral sleeve-like extension 53 which is pivotally received in an upper part 9a of the adjacent bracket 9, as best shown in Figure 5. The extension 53 is hollow so as to receive a pipe or shaft section 54 which extends laterally inwardly and is pivoted in a bracket 55 secured to the center plow beam 3. The pipe member 54 forms a rigid part of the tubular member 52. The lower end of the tubular member 52 is formed with a passage 56 which communicates with the interior of the reservoir member 52 and a second passage 57 that leads into communication with the upper end of the ram cylinder 49. A third passage 58 is provided in alignment with the passage 57, and the three passages 56, 57 and 58 are connected into a transverse valve bore 59 in which a plug valve 60 is disposed. At its lower end, the passage 58 leads into a threaded boss which receives the upper end of an intake pipe 81 to be referred to later.

The casing 46 is split, as at 65, and the adjacent parts are flanged and apertured to receive bolts 66 by which the casing parts may be secured together and to provide for the assembly of the cam wheel 41 within the casing. The upper section of the casing 46 is provided with a shoulder 67 on which a protecting sheath or tube 71 is connected, as by a press fit. A bead 72 is formed in the upper end of the protecting sheath 71 and receives a felt packing member 74 or other suitable means to prevent the entry of dust, dirt and the like into the space surrounding the ram cylinder 49. By this means dust is prevented from working into the surfaces on the outside of the pump casing cylinder 47 and the inside of the cylinder 49.

Figures 3, 4:
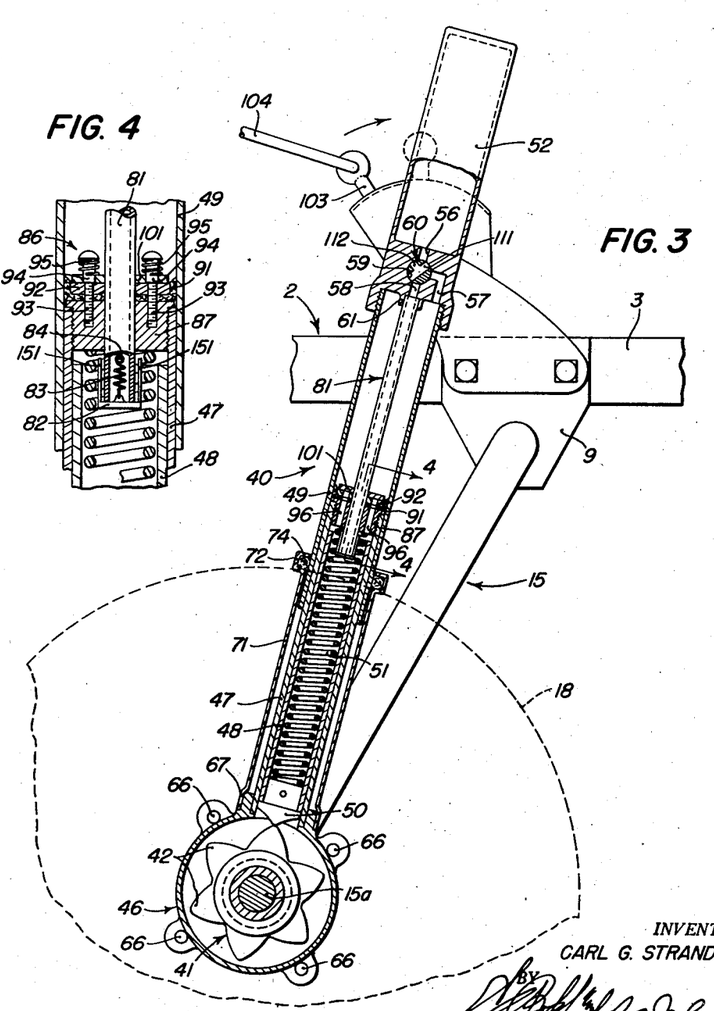
Figure 3 is an enlarged view, certain parts being shown in section, of the hydraulic lift and depth control mechanism shown in Figure 2, the parts being shown in the same relative position.
Figure 4 is an enlarged sectional view taken generally along the line 4—4 of Figure 3.

An intake passage in the form of a stem 81 is threaded at its upper end and is screwed into the lower part of the reservoir 52 so as to open into communication with the valve bore 58. A suction valve 82 normally closes the lower end of the tube 81 and is yieldingly held in a closed position by a spring 83 anchored at one end to the valve and at the other end to a pin 84 carried by the stem 81. The intake tube 81 passes through a valved closure member indicated in its entirety by the reference numeral 86 and which comprises a threaded plug 87 screwed into the upper end of the pump casing 47. A leather cup-shaped packing member 91 and follower ring 92 are carried by the plug 87, being held in place by screws 93, each of which has an elongated shouldered portion 94 about which a spring 95 is disposed. The closure part 87, the cup 91 and the follower ring 92 are provided with registering apertures 96, as indicated in Figure 3, and disposed above the openings 96 is a ring valve 101 which is capable of moving upwardly away from the openings 96, thereby providing for a movement of fluid from the pump cylinder 47 up into the space between the closure member 87 and the inner end of the ram cylinder 49, but which serves as a check valve preventing the backward flow of fluid from the cylinder 42 into the pump chamber 47. The ring valve 101 is held in place by the springs 95 (Figure 4). The stem or tube 81 passes through the member 87 with a snug fit, which may be secured by honing, or by the use of suitable packing or the like, so that leakage of fluid from within the ram cylinder 62 into the pump cylinder 47 is prevented.

Figure 6:
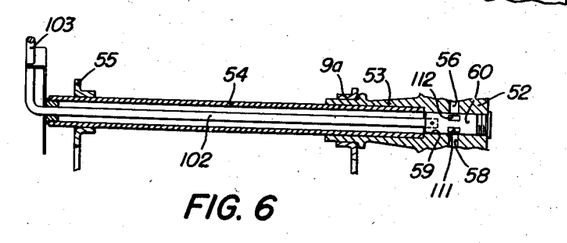
Figure 6 is a sectional view showing the valve control parts, being a section taken approximately along the line 6—6 of Figure 5.

The valve 60, as best shown in Figure 6, is operated by a long stem 102 that passes through the pivot supporting pipe 54 and which terminates in an arm 103 the upper end of which is apertured, as best shown in Figure 2, to receive the rear end of an operating rod 104. The latter is supported by an eye 105 which is fixedly secured to the side of the sleeve 31 opposite the stud 32, as best shown in Figure 1. However, like the stud 32, the eye 105 does not extend through the sleeve 31.

One of the features of the present invention is the provision of a hydraulic mechanism which is energized by the rotation of the ground wheel 18 and which is automatically controlled according to the setting of the valve 60, the position of which is controlled by the rod 104. The latter member, as best shown in Figure 1, terminates forwardly in a handle section 104a. The valve 60 is provided with a through bore 111 and a cross bore 112 communicating therewith, the arrangement being that best shown in Figure 3. The valve 60 is controlled by the stem 102 and arm 103, and in order to hold the valve 60 yieldingly against movement relative to the frame of the plow, a spring member 115 is provided, the latter being fixed to one of the bolts connecting the brackets 9 and 55 to the beam 3, as shown in the left-hand portion of Figure 5. The upper part of the member 115 is apertured so that the stem 102 may extend therethrough, as shown in Figure 6, and the uppermost part of the spring member 115 is turned laterally, as at 116, and is provided with a plurality of serrations 117 and terminal tongues or stops 118 and 119. The notches or serrations 117 are adapted to embrace and hold the arm 103 in different positions of adjustment but when a forward or rearward thrust is transmitted to the arm 103 the spring member 115 yields so as to permit the arm being moved to different positions. The upper part of the member 115 is provided with a plurality of apertures 121 (Figure 7) so that the member 115 may receive a stop or abutment member 122 in any one of a number of different positions. Preferably, the abutment 122 takes the form of a spacer 123 and a cotter 124.

The operation is substantially as follows:

Assuming, first, that the implement is in its raised position, as shown in full lines in Figures 2 and 3, with the valve 60 and its operating arm 103 arranged so that the upper end of the bore 111 lies just to the right of the lower end of the bore 56 (Figure 3) so that all passages are closed. Since all passages are closed, there can be no flow of oil from the reservoir 52 down through the tube 81 to the pump, and therefore the pump plunger 48 is held in its upper position substantially out of contact with the constantly rotating cam member 41. Also, the closing of the passages 57 and 58 prevents any oil from flowing out of the ram cylinder 49 up into the reservoir 52. Therefore, the implement is locked hydraulically in its raised position.

Assuming now that the operator desires to lower the plow into operating position, all that he needs to do is to push rearwardly on the valve operating rod 104. This swings the arm 103 (Figure 3) in a clockwise direction and, at about the position indicated in dotted lines in Figure 3, the cross bore 112 and the right-hand portion of the bore 111 connects the bores 56 and 57, whereupon oil may flow from the ram cylinder 49 up into the reservoir 52. This permits the plow frame and plow bottoms to lower into their operating position. As this action takes place the crank axle 15 swings forwardly, and this, in turn, swings the hydraulic piston and cylinder unit 40 in a clockwise direction, as viewed in Figure 3, thus, in effect, following the movement of the valve 60. Therefore, if the arm 103 is moved in its lowering direction, say five or ten degrees past the position indicated in dotted lines in Figure 3, the resulting forward swinging of the crank axle 15 and consequent clockwise angular movement of the hydraulic unit 40 as a whole about the axis of the valve 60 will automatically close off the connection 111, 112 between the bores 56 and 57. As soon as this occurs, the crank axle 15 again becomes hydraulically locked and with it the crank axle 16. If this is not as deep as desired, all the operator has to do is to move the valve operating rod 104 an additional amount rearwardly, thus swinging the valve 60 in a clockwise direction and momentarily opening communication between the passages 56 and 57, but as soon as the resulting lowering of the implement has rocked the power lift unit 40 an additional amount in a clockwise direction (Figure 3) the passages 56 and 57 are again closed off and lowering terminated. At any point, of course, the operator may pull forward on the rod 104, which will swing the arm 103 forwardly and cause the bore 111 to open communication between passages 56 and 58, whereupon fluid is then free to flow to the pump by which it is pumped under pressure into the ram cylinder 49, thus extending the pump cylinder, which acts as a piston, and swings the crank axles downwardly relative to the frame 3.

Under many if not most conditions, the plowing depth is usually constant, and for conditions of this nature the abutment member 122 may be utilized to establish a stop against which the arm 103 may be brought by a rearward thrust exerted through the rod 104 against the arm 103. By the action just described above, moving the arm 103 to a given position in the lowering direction, automatically determines the operating position into which the tools will be moved by the controlled release of oil from the ram cylinder 49. If it is desired to lower the tools to the maximum depth of plowing, the abutment member 122 may be removed and the arm 103 swung all the way rearwardly up against the terminal stop 119.

Figures 8, 9, 10:
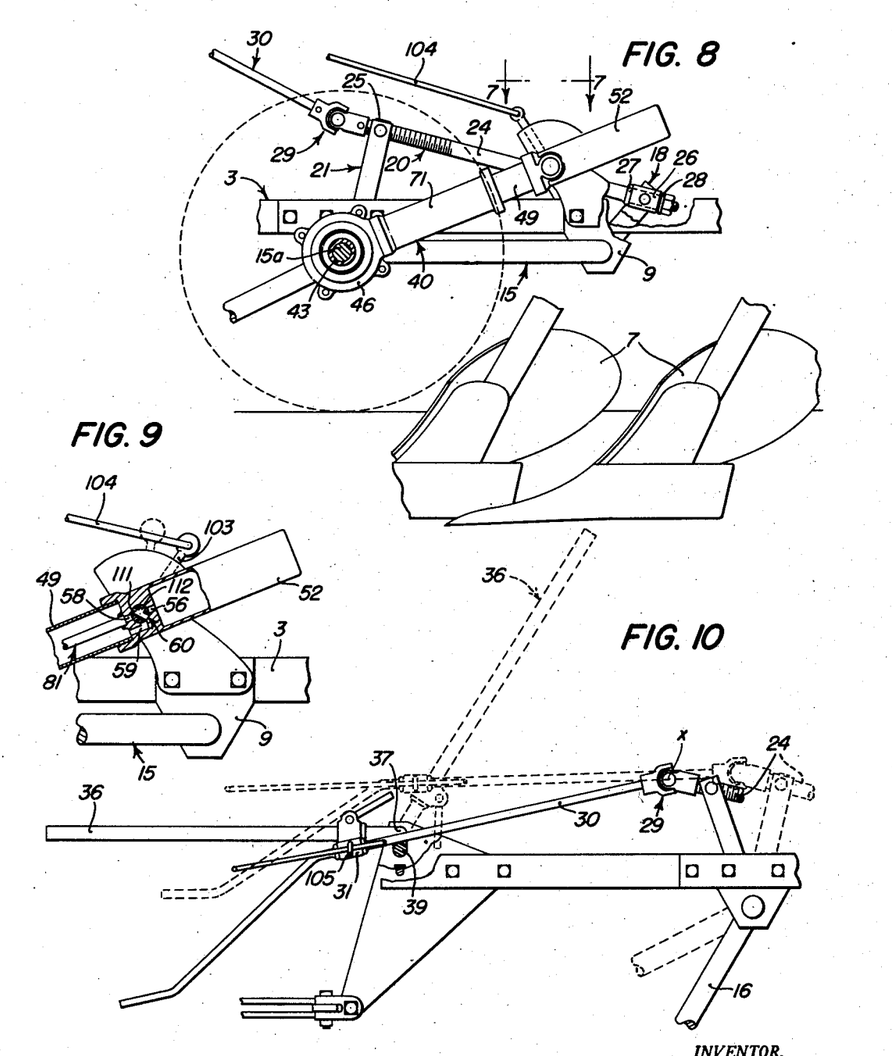
Figure 8 is a partial side view, similar to Figure 2, showing the power lifting unit in lowered or operating position, representing the deepest plowing position.
Figure 9 is a fragmentary view, showing the control valve and the power lift unit in the fully lowered or operating position.
Figure 10 is a partial side view showing the action of the emergency hand lift.

When this is done the implement lowers until the parts reach the relative positions shown in Figure 8, at which time the resulting angular displacement of the power lift unit 40, particularly the casing 52, about the axis of the valve 60 eventually closes off the communication between passages 56 and 57, the position of the valve 60 at this time being indicated in full lines in Figure 9. Again, it will be noted, all passages are closed and no oil can flow from the reservoir 52 to the pump nor from the ram cylinder to the reservoir. Therefore, the power lift unit is inactive and the pump does not operate.

With the parts in their lowered or operating position, the action in raising the plow to its transport position is substantially as follows. Referring first to Figures 8 and 9, a forward pull on the rod 104 will swing the valve control arm 103 from the full line position of Figure 9 to the full line position in Figure 8. As soon as the arm 103 reaches the position indicated in dotted lines in Figure 9, the port or bore 111 starts to open communication between the bores 56 and 58, whereupon oil is permitted to flow from the reservoir 52 down to the pump. The latter therefore begins to operate and to force oil under pressure into the ram cylinder 49. This swings the crank axle 15, and with it the crank axle 16, downwardly and rearwardly, resulting in an angular movement of the power lift unit 40 in a counter-clockwise direction (Figures 3, 8 and 9). Thus, again, the power lift unit follows the valve 60, and if, for example, the arm 103 be left in some position forward of its dotted line position in Figure 9, the downward swinging movement of the crank axles 15 and 16 will automatically terminate. This is an advantage in that it may not always be necessary to raise the plow to its fully raised position, as when turning at the end of the field. However, if it is desired to raise the plow to its fully raised or transport position, the arm 103 is pulled forwardly into the position shown in Figure 8, whereupon oil will flow from the reservoir 52 down through the passages 56, 111 and 58 into the tube 81 and from the latter into the pump so that oil will be directed by the latter under pressure into the ram cylinder until, in the fully raised position, the power lift casing 40 has been swung angularly into a position (Figure 3) in which the communication between passages 56 and 58 is closed off. It should be mentioned that the passages 56, 57, 58, 111 and 112 are relatively long and narrow, as best shown in Figure 6, so that the action of closing off the passages by the movement of the casing is quite positive and relatively rapid, thus avoiding delays in reaching the desired operating position or the desired raised position.

The leveling adjusting crank 30 and the valve control rod 104 are supported on the standard 36 by means of the vertically adjustable clamp casting 33, as described above and as best shown in Figure 2. By adjusting the member 33 vertically on the standard 36, the crank and valve rod may be disposed in the best position most convenient to the operator on the tractor which propels the plow. It may sometimes occur, however, that the power lift unit 40 may not be available to raise the plow into its transport position. For example, the outfit may strike a soft spot in the field and the tractor lose traction or start to mire down, or the ground may be quite wet and the ground wheel 18 lack sufficient traction to raise the plow. To take care of these and other situations in which it may be desired to raise the plow manually, the standard 36 has been especially constructed to serve as a hand lever, augmented, if necessary to secure the necessary leverage, by a pipe placed over the end of the standard 36. Referring now more particularly to Figures 2 and 10, in order to utilize the standard 36 as a hand lift, the clamp casting 33 is loosened and shifted downwardly on the standard 36 until it engages a collar 150 which forms a part of a member 151 by which the standard 36 is connected to the rockshaft 37. The clamp casting 33 is then tightened in place, the parts taking the positions shown in dotted lines in Figure 10. The standard 36 may then be rocked forwardly from the position shown in dotted lines (Figure 10) into the position shown in full lines, and this will exert a pull through the rod 30 and the universal joint 29 against the adjusting rod 24 which, acting through the arms 18 and 21, will swing the crank axles 15 and 16 downwardly into their raised positions (full lines, Figures 2 and 10). The parts are so arranged that, especially by virtue of the bend 39 (Figure 10), the axis of the stud 32 passes below a line connecting the axis of rocking movement of the rockshaft 37 and the horizontal axis X (Figure 10) of the universal joint 29. Thus, the plow is locked in its raised position by the toggle action of the rod 30 and associated parts, the rod 30 resting against the bent section 39 in holding the plow in its raised or transport position. The plow may be lowered by lifting upwardly on the standard 36.

Referring again to the hydraulic unit, the rotation of the ground wheel 18 drives the cam member 41 and the parts are preferably designed so that the pump has sufficient capacity to fully extend the ram unit by approximately a half turn of the associated ground wheel 18. This may, of course, vary, as desired. The operator may stop the raising or lowering movement at any time he desires merely by moving the arm 103 in the proper direction. Also, if for any reason during the raising action the pump should operate after the plow is raised, the additional movement outwardly of the ram cylinder 49, carrying with it the stem 81, will bring the check valve 82 up against the closure member 87, as best shown in Figure 4, the check valve 82 having upwardly extending fingers 181 for this purpose, whereby any excessive extension of the ram will automatically open the check valve so that, while the pump is operating, it is not capable of extending the ram any farther since the oil that is pumped into the ram cylinder merely flows back to the pump. It will then be necessary for the operator to move the arm 103 into the lowering position in order to permit the oil to flow into the reservoir and to permit the ram to retract, lowering the suction valve 82 away from the closure member 87.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising a frame, a crank axle swingably connected therewith, a hydraulic ram unit connected between said frame and crank axle for changing the position of the latter relative to the frame, means for controlling said ram unit, means responsive to the angular movement of said crank axle, and means connecting said responsive means to said ram unit controlling means.

2. An agricultural implement comprising a frame, a crank axle swingably connected therewith, a hydraulic ram unit connected at one end with the swinging end of said crank axle and pivotally connected at its other end with said frame for changing the position of the crank axle relative to the frame, means for controlling said ram unit, means responsive to the pivotal movement of said ram unit relative to said crank when said crank axle is swung, and means connecting said responsive means to said ram unit controlling means for controlling said ram unit by its pivotal movement.

3. An agricultural implement comprising a frame, a crank axle swingably connected therewith, a ground wheel journaled thereon, a hydraulic ram unit connected between said frame and crank axle for raising the frame relative to the crank axle, and means deriving operating power from said gang wheel for operating said hydraulic ram unit.

4. An agricultural implement comprising a frame, a crank axle swingably connected therewith and carrying a ground wheel, and a hydraulic ram unit connected between said frame and the crank axle and including a pump driven by said ground wheel, said ram unit acting between said frame and crank axle to shift the latter, and means for controlling said ram unit.

5. An agricultural implement comprising a frame, a crank axle swingably connected therewith, a hydraulic ram unit connected between said frame and the crank axle to shift the latter, means for controlling said hydraulic ram unit including valve means having a pair of relatively movable parts, movement of one relative to the other serving to control the flow of fluid to and from said ram unit, and means responsive to the movement of the crank axle relative to said frame and connected with said movable part for controlling said ram unit.

6. In a hydraulic system, a pair of parts, one shiftable about an axis relative to the other, a ram connected to one of said parts for movement relative thereto about an axis spaced from said first axis and acting against the other part for moving one relative to the other, a source of fluid under pressure for operating said ram, and valve means controlling the flow of fluid between said source and said ram and comprising a ported valve member of the rotary type carried on said one part and normally held against movement and a ported valve casing receiving said valve member and carried on said ram, said valve member being mounted coaxially with respect to said second axis, the ports of said valve member and casing being arranged whereby when said valve member is turned to a position relative to said casing to thereby provide for extending or retracting the ram and swinging one part relative to the other, the resulting swinging of the ram about said second axis shifts said valve casing relative to said valve member so as to automatically terminate the operation of said ram at a point dependent upon the particular position to which said valve member is moved.

7. The invention set forth in claim 6, further characterized by adjustable means defining one position to which said valve member may be moved.

8. An agricultural implement comprising a frame, a crank axle swingably connected therewith and carrying a ground wheel, a hydraulic pump driven by said ground wheel, a piston and cylinder unit adapted to receive fluid delivered thereto by said pump and connected between the swinging end of said crank axle and said frame for changing the position of said crank axle by the operation of said wheel driven pump, a reservoir adapted to contain fluid, valve means controlling the flow of fluid from said reservoir to said pump, and means responsive to a predetermined extension of said cylinder and piston unit for operating said valve so as to stop the delivery of fluid by said pump into said cylinder.

9. A hydraulic unit comprising a generally vertically disposed casing, a plunger movable therein, a driving member in the lower portion of said casing for reciprocating said plunger, a valve-controlled closure closing the upper end of said casing, a cylinder disposed in leak-tight relation about the upper portion of said casing and forming with said closure a chamber to receive fluid therefrom, a reservoir carried at the upper end of said cylinder, there being passage means between the upper end of the cylinder and lower end of said reservoir whereby the latter is adapted to receive fluid from said chamber, and valve means controlling the flow of fluid through said passage means between said pump, chamber, and reservoir.

10. An agricultural implement comprising a frame, a crank axle swingably connected therewith and carrying a ground wheel and a pump casing, a pump plunger disposed in said casing, means for driving said pump plunger by the rotation of said ground wheel, a combined cylinder and reservoir member connected at its upper end with said frame and slidably mounted on said pump casing so as to form a ram cylinder between said pump casing and the upper end of said cylinder, valve-controlled means for directing fluid flow from said reservoir to said pump, and valve means controlling the flow of fluid from said ram cylinder back to said reservoir.

11. A hydraulic unit comprising a pump casing, a pump plunger reciprocable therein, a driving member for reciprocating said plunger, closure means including a check valve closing the end of said casing, a tubular member extending through said closure means into communication with said pump plunger, a cylinder disposed in sealed relation about said casing and carrying said tubular member, a reservoir connected with said cylinder and communicating with said tubular member so as to supply fluid to said pump casing, a check valve at the inner end of said tubular member, and valve means movable from one position in which fluid flows from said reservoir through said tubular member into said pump into another position in which fluid flows from said cylinder back to said reservoir.

12. The combination of a hydraulic unit as defined in claim 11, an agricultural implement including a frame and a swinging crank axle carrying a ground wheel, means for reciprocating said pump plunger by the rotation of said ground wheel, and means connecting the upper end of said reservoir with said frame, whereby the extension of said piston and cylinder serving to swing said crank axle relative to said frame.

13. An agricultural implement comprising frame means, a pair of crank axles swingable thereon and carrying ground wheels, means connecting said crank axles to cause them to swing together, mechanism connected between said frame and one of said crank axles for swinging both of the latter by energy derived from the rotation of the wheel on said one crank axle, and means acting against said connecting means for also swinging said crank axles.

14. An agricultural implement comprising frame means, a pair of crank axles swingable thereon and carrying ground wheels, adjustable means connecting said crank axles to cause them to swing together, mechanism connected between said frame and one of said crank axles for swinging both of the latter by energy derived from the rotation of the wheel on said one crank axle, means for actuating said adjustable means to swing one crank axle relative to the other, and means adapted to act against said actuating and adjusting means for manually swinging both of said crank axles.

15. An agricultural implement comprising a support, a crank axle swingably connected therewith, a ram connected with said axle and said support, said ram swinging about an axis on said support when being extended or retracted to shift said crank axle, and valve means for controlling said ram and mounted coaxially with respect to said axis, said valve means having one part normally connected with said support and the other part movable with said ram whereby movement of the first valve part relative to the second valve part out of one relative position into another position causes operation of said ram until the resulting movement of said crank axle swings said ram and shifts said second valve part relative to said first valve back into said one relative position.

16. An agricultural implement comprising frame means, a pair of crank axles swingable thereon and carrying ground wheels, adjustable means connecting said crank axles to cause them to swing together, power operated mechanism connected between said frame and one of said crank axles for swinging both of the latter, means for actuating said adjustable means to swing one crank axle relative to the other, and means adapted to act against said actuating and adjusting means for manually swinging both of said crank axles as in the event of failure of said power operated mechanism.

17. An agricultural implement comprising a frame, a crank axle swingably connected therewith and carrying a ground wheel, a hydraulic pump driven by said ground wheel, and a piston and cylinder unit adapted to receive fluid delivered thereto by said pump and connected between the swinging end of said crank axle and said frame for changing the position of said crank axle by the operation of said wheel driven pump.

18. An agricultural implement comprising a frame, a crank axle swingably connected therewith and carrying a ground wheel, a hydraulic pump supported on said crank axle adjacent the lower portion thereof, means for driving said pump from said ground wheel, and a piston and cylinder unit adapted to receive fluid delivered thereto by said pump and connected between the swinging end of said crank axle and said frame for changing the position of said crank axle by the operation of said wheel driven pump.

19. An agricultural implement comprising a frame, a crank axle swingably connected therewith and carrying a ground wheel, a hydraulic pump supported on said crank axle adjacent the lower portion thereof, means for driving said pump from said ground wheel, a piston and cylinder unit adapted to receive fluid delivered thereto by said pump and connected between the swinging end of said crank axle and said frame for changing the position of said crank axle by the operation of said wheel driven pump, and valve mechanism for controlling the flow of fluid between said pump and piston and cylinder unit and comprising a pair of relatively movable parts, means connecting one of said parts to be moved by the swinging movement of said crank axle, and means for adjusting the position of the other part.

CARL G. STRANDLUND.